United States Patent [19]

Yoshida et al.

[11] 4,322,742
[45] Mar. 30, 1982

[54] METHOD AND APPARATUS FOR IMPROVING THE SHARPNESS OF A VIDEO PICTURE

[75] Inventors: Susumu Yoshida, Naritanishi; Yoshio Ishigaki, Tokyo; Kinya Shinkai, Yokohama, all of Japan

[73] Assignee: Sony Corporation, Tokyo, Japan

[21] Appl. No.: 855,304

[22] Filed: Nov. 28, 1977

[30] Foreign Application Priority Data

Nov. 30, 1976 [JP] Japan .................... 51/160885[U]

[51] Int. Cl.$^3$ .................... H04N 9/20; H04N 5/68
[52] U.S. Cl. .................... 358/65; 358/242
[58] Field of Search .................... 363/411–414, 363/448, 449, 409; 358/64, 162, 166; 315/386; 358/65

[56] References Cited

U.S. PATENT DOCUMENTS

| | | | |
|---|---|---|---|
| 2,103,645 | 12/1937 | Schlesinger | 313/434 |
| 2,678,964 | 5/1954 | Loughlin | 358/166 |
| 2,840,754 | 6/1958 | Linder | 313/453 X |
| 2,884,559 | 4/1959 | Cooper, Jr. et al. | 313/426 X |
| 3,830,958 | 8/1974 | Fuse et al. | 358/64 X |
| 3,919,583 | 11/1975 | Hasker et al. | 313/448 |
| 3,936,872 | 2/1976 | Miyaoka | 358/64 |
| 3,946,266 | 3/1976 | Saito et al. | 313/412 X |
| 3,980,819 | 9/1976 | Schwartz | 358/242 X |
| 4,057,747 | 11/1977 | Hamano | 313/414 X |
| 4,080,628 | 3/1978 | Jirka | 358/242 X |

FOREIGN PATENT DOCUMENTS 18286 8/1935 Australia ..................... 358/242

*Primary Examiner*—Aristotelis M. Psitos
*Attorney, Agent, or Firm*—Lewis H. Eslinger; ALvin Sinderbrand

[57] ABSTRACT

A method and apparatus for improving the sharpness of a video picture displayed on the screen of a cathode ray tube. At least one electron beam scans the screen in line-scanning and vertical directions, respectively, the electron beam having its intensity modulated in accordance with a video signal. The scanning velocity of the electron beam is modulated in the line-scanning direction in accordance with transitions of the video signal which correspond to transitions between high and low brightness levels of the displayed video picture. Each electron beam is shaped to have a substantially oval shape whose longer axis is disposed in the line-scanning direction and whose shorter axis is disposed in the vertical direction, whereby the oval-shaped beam impinges upon the display screen and the sharpness of the displayed video picture in the vertical direction is improved.

10 Claims, 13 Drawing Figures

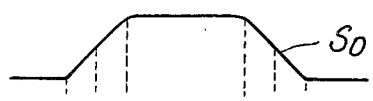
FIG.1A
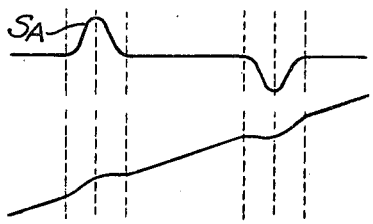
FIG.1B
FIG.1C
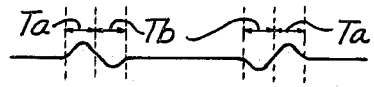
FIG.1D
FIG.1E
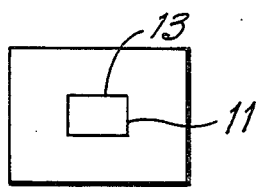
FIG.2A
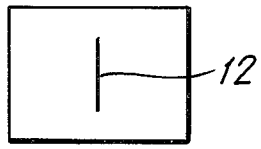
FIG.2B
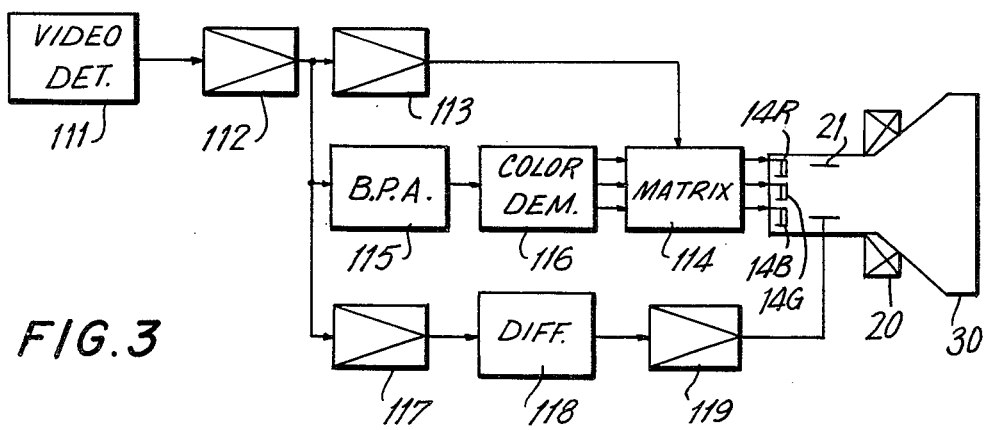
FIG.3

METHOD AND APPARATUS FOR IMPROVING THE SHARPNESS OF A VIDEO PICTURE

BACKGROUND OF THE INVENTION

This invention relates to video signal reproducing apparatus and, more particularly, to a method and apparatus for improving the sharpness of the video picture displayed on the screen of a cathode ray tube included in such video signal reproducing apparatus.

The problem of improving the sharpness of an image displayed on the screen of video display apparatus long has been a problem in the video signal reproducing art. This problem is found in both monochrome (black-and-white) and color video display apparatus. The brightness of a displayed image is, of course, dependent upon the intensity of the light emitted to form that image. In a typical display screen of a cathode ray tube (CRT) of the type conventionally used in video signal reproducing apparatus, such as in a television receiver, phosphor elements, such as dots, are provided on the screen and are adapted to be excited by an impinging electron beam, whereby a corresponding amount of light is emitted thereby in accordance with the intensity of the exciting beam. Thus, increased brightness is achieved by increasing the intensity of the electron beam which impinges upon the phosphor screen. However, when the intensity of an electron beam is increased, the size of the landing beam spot which impinges upon the screen likewise is increased. This means that the area on the screen which is excited to emit brighter light is relatively large.

The sharpness of an image displayed on the phosphor screen of a CRT is, to a great extent, determined by the size of the landing beam spot. As mentioned above, when the intensity of the electron beam is increased so as to increase the brightness of the displayed image, the size of the landing beam spot likewise is increased. Consequently, at boundaries between relatively high and low brightness levels, the demarcation between such levels is not precisely defined and, therefore, the bright image appears to be blurred or "fuzzy".

The problem of lack of sharpness in the displayed image of a CRT also is due, at least in part, to the relatively low frequency response of the video signal reproducing apparatus. For example, if a horizontal line interval of a video signal includes an abrupt change in the brightness level, the slow response of the apparatus effectively prevents the intensity of the scanning electron beam from changing in a corresponding abrupt manner. Thus, when the displayed video picture is viewed in the line-scanning direction, this relatively slow change in the intensity level of the electron beam is seen as an ill-defined demarcation or boundary. That is, the sharpness of the reproduced image is degraded at portions of the image where abrupt changes in brightness occur in response to transitions in the brightness of the video signal which is reproduced.

The effects caused by the relatively large landing beam spot for bright levels in the video picture and the relatively slow frequency response of the video signal reproducing apparatus are cumulative, resulting in an image whose sharpness is less than satisfactory. Various proposals have been addressed to this problem of image-sharpness in a video picture. In the so-called aperture compensation technique, the intensity of the electron beam first is decreased and then is increased at positive transitions in video brightness levels, and an inverse operation is performed at negative transitions in the video brightness level. However, by increasing the intensity of the electron beam to be greater than the highest level actually represented by the video signal, the resultant landing beam spot is made larger than it otherwise would be. Another proposal for improving the sharpness of a displayed image is the so-called beam-scanning velocity modulation technique. In this technique, the scanning velocity of the electron beam in the line-scanning direction is changed, or modulated, in accordance with the transitions in the brightness level of the video signal from which the displayed video picture is derived. The brightness-level transitions are used to effect a supplemental horizontal deflection of the electron beam in addition to the main horizontal deflection thereof. In particular, at the transition in the video signal from a lower to a higher brightness level, the scanning of the beam first is accelerated and then is decelerated in the line-scanning direction; and at transitions in the video signal from higher to lower brightness levels, the scanning of the beam first is decelerated and then is accelerated in the line-scanning direction. This has the effect of improving the sharpness of the displayed image in the line-scanning, or horizontal, direction. However, this beam-scanning modulation technique has no effect upon the actual sharpness of the displayed image in the vertical direction, nor does a viewer perceive any subjective, or psychological improvement in the vertically-directed sharpness of the image.

OBJECTS OF THE INVENTION

Therefore, it is an object of the present invention to provide a method and apparatus for improving the sharpness of a displayed video picture.

Another object of this invention is to improve the sharpness of a displayed image in the vertical direction as well as in the horizontal direction in a video picture.

A further object of this invention is to improve the sharpness of a displayed video picture at the boundary between lower and higher brightness levels without reducing the intensity of the electron beam corresponding to the brighter level.

An additional object of this invention is to improve the sharpness of a video picture both for monochrome and color television signal receiving apparatus.

Yet another object of this invention is to improve the sharpness of a displayed video picture, particularly in the vertical direction thereof, by shaping the electron beam which impinges upon the video display screen so as to have a substantially oval shape with the longer axis disposed in the horizontal direction.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus for improving the sharpness of an image displayed on the screen of a cathode ray tube in video signal reproducing apparatus are disclosed. At least one electron beam scans the screen in line-scanning and vertical directions, respectively, the intensity of the scanning beam being modulated in accordance with a video signal. The scanning velocity of the electron beam is modulated in the line-scanning direction in accordance with transitions of the video signal corresponding to changes between relatively high and low brightness levels of the displayed video picture. Each electron beam is shaped to have a substantially oval shape with the longer axis thereof disposed in the line-scanning direction and the shorter axis thereof disposed in the vertical direction, whereby the oval-shaped electron beam impinges upon the display screen and the sharpness of the displayed video picture in the vertical direction is improved.

BRIEF DESCRIPTION OF THE DRAWINGS

The following detailed description, given by way of example, will best be understood in conjunction with the accompanying drawings in which:

FIGS. 1A–1E are waveforms to which reference will be made in explaining the scanning-beam velocity modulation technique;

FIGS. 2A and 2B are diagrammatic views representing reproduced video pictures having bright and dark areas;

FIG. 3 is a block diagram of one embodiment for achieving beam-scanning velocity modulation which can be used with the present invention;

DETAILED DESCRIPTION OF A CERTAIN PREFERRED EMBODIMENT

Figure 4:
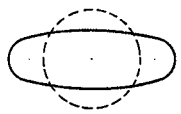
FIG. 4 represents a modification of the shape of the landing beam spot in accordance with the present invention.

Referring now to the waveforms shown in FIGS. 1A–1E, the original video signal $S_O$ (FIG. 1A) from which the reproduced picture is derived is shown to have rising and falling edges at transitions between low-and-high brightness levels and between high-and-low brightness levels, respectively, these edges exhibiting a relatively gradual slope as opposed to an abrupt change. The gradual rising and falling edges are attributed to the relatively low frequency response of the video signal reproducing apparatus, as described above. That is, although the video signal which is produced by, for example, a video camera may exhibit such abrupt transitions in brightness levels, the actual video signal which is applied to the video picture reproducing apparatus will exhibit a waveform substantially as shown in FIG. 1A. If the video picture reproducing apparatus includes a monochrome video picture tube, then a single electron beam is emitted from the electron gun, and video signal $S_O$ is used to modulate the intensity of that beam. If the video picture reproducing apparatus includes a color video picture tube, then a number of electron beams, such as red, green and blue beams, will be emitted, and the intensity of the respective beams is determined by video signal $S_O$.

In addition to deriving the electron beam or beams from video signal $S_O$, this video signal is received in a separate channel whereat it is differentiated to produce a compensating signal $S_A$, as shown in FIG. 1B. Compensating signal $S_A$ is applied to a supplemental deflection means, for example, sub-deflecting plates as described in U.S. Pat. No. 3,830,958, or to a split lens electrode as described in U.S. Pat. No. 3,936,872, so that the horizontal deflection field for the beam or beams in the line-scanning direction is modified or compensated, as shown in FIG. 1C. As a result of this modified or compensated horizontal deflection field, the beam scanning velocity in the line-scanning direction is modulated as shown in FIG. 1D. Thus, during each interval $T_a$, the beam scanning velocity is increased so that a decreased amount of light is emitted from the phosphor elements or areas on the display screen that are excited by the electron beam during this interval. Also, during each interval $T_b$, the beam scanning velocity is decreased so that an increased amount of light is emitted from the phosphor elements or areas which are excited by the electron beam or beams during this period. Therefore, the variation in the intensity of the light emitted from the display screen in the horizontal or line-scanning direction is substantially as represented by the waveform shown in FIG. 1E. It should be appreciated that, although the light intensity may be represented by the waveform shown in FIG. 1E, this waveform does not represent the actual video signal which is applied to the video picture tube and, therefore, is not caused by a landing beam spot of undesirably increased size. Rather, the waveform of FIG. 1E represents that the sharpness of the reproduced picture in the horizontal direction is improved by reason of this beam-scanning velocity modulation.

While the foregoing technique results in improved sharpness in the line-scanning direction, this technique has no effect upon the sharpness of the image in the vertical direction. This can best be appreciated by referring to FIGS. 2A and 2B which depict different areas as examples which may be displayed on the screen of a video picture tube. The display in FIG. 2A may appear as a relatively bright rectangle, or window, superimposed onto a relatively dark background. In FIG. 2B, the display is merely a vertical line 12 which is relatively bright and which is superimposed onto a relatively dark background. In FIG. 2A, the improved sharpness which is attained in the horizontal direction by the aforedescribed beam-scanning velocity modulation technique results in a relatively sharp vertical bright edge 11 with respect to the dark background. In FIG. 2B, vertical bright line 12 will appear as a sharp image with respect to the dark background. However, in FIG. 2A, the horizontal edge 13, which appears as a bright-dark transition in the vertical direction, will not be as well-defined as vertical edge 11. It is the primary object of the present invention to improve the sharpness of horizontal edge 13 in the video picture which is displayed by video picture reproducing apparatus, that is, the present invention improves the sharpness of an image in the vertical direction as well as in the horizontal, or line-scanning, direction.

Referring to FIG. 3, there is illustrated a block diagram of video signal reproducing apparatus with which the present invention finds ready application. The illustrated video signal reproducing apparatus includes a video detector 111 for receiving a video signal which, for example, may be constituted as a composite color video signal having luminance components which occupy a relatively lower frequency band, and chrominance components, which occupy a relatively higher frequency band. Video detector 111 includes conventional video circuits, such as RF amplifier, IF amplifier, and the like. Since video detector 111 is of conventional construction, further detailed description of such circuits is omitted in the interest of brevity. Suffice it to say that the output signal produced by video detector 111 is a video signal which may be represented as, for example, video signal $S_O$, shown in FIG. 1A. This video signal $S_O$, here assumed to be a composite color video signal, is further amplified by a video amplifier 112 and is supplied to three channels, as shown, including a luminance channel comprised of amplifier 113, a chrominance channel comprised of band-pass amplifier 115, color demodulator 116 and matrix circuit 114, and a beam-scanning velocity modulation control channel comprised of amplifier 117, differentiating circuit 118 and amplifier 119. The luminance channel additionally may include a low-pass filter (not shown) whose cut-off frequency extracts the luminance signal from the composite color video signal. This is conventional, and for the purpose of the present description, it is recognized that the output signal produced by video amplifier 113 is the luminance signal Y included in the composite color video signal.

Band-pass amplifier 115 is coupled to video amplifier 112 to receive the composite color video signal therefrom. The band-pass amplifier has a passband which is effective to amplify the chrominance component of the composite color video signal, but substantially attenuates the luminance component. Accordingly, the output of band-pass amplifier 115 is constituted essentially by the chrominance signal which, as is conventional, is formed of color information signals modulated onto a subcarrier. The output of the band-pass amplifier is applied to color demodulator 116 wherein the modulated color information signals are demodulated to produce respective color difference signals at the output of demodulator 116. Hence, color difference signals R-Y, G-Y and B-Y are obtained at the respective outputs of color demodulator 116. These color difference signals are applied to matrix circuit 115, and the derived luminance signal Y also is applied to the matrix circuit. Matrix circuit 114 is conventional and is operative to combine the color difference signals and the luminance signal to produce the individual color signals R, G and B at the respective outputs thereof.

A cathode ray tube 30, which may be of the type known as the Trinitron tube, as disclosed in U.S. Pat. No. Re. 27,751, includes an electron gun having red, green and blue cathodes 14R, 14G and 14B, respectively, connected to the respective outputs of matrix circuit 114, and additionally includes a display screen positioned at an opposite end of the tube envelope, remote from the color cathodes. Video display tube 30 additionally includes a horizontal and vertical deflection yoke assembly 20 which conventionally receives horizontal and vertical sweep signals derived from the received video signal. The deflection yoke assembly is conventional and is adapted to scan each of the red, green and blue electron beams emitted by red, green and blue cathodes 14R, 14G and 14B, respectively, across the display screen. Thus, a color raster is produced by the respective electron beams, and correspondingly colored phosphors are excited to display a color video picture, as is conventional.

The video signal $S_O$ produced at the output of video amplifier 112 is further amplified by amplifier 117 and is differentiated by differentiating circuit 118 to produce the compensation signal $S_A$ shown in FIG. 1B. This compensation signal is amplified by amplifier 119 and is applied to supplemental deflection means, here shown as supplemental deflecting plates 21. As an alternative, deflecting plates 21 may be replaced by a split lens electrode for providing supplemental deflection, as disclosed in aforementioned U.S. Pat. No. 3,936,872.

In one embodiment, the signal $S_O$ applied to differentiating circuit 118 may be comprised of the luminance component Y included in the composite color video signal.

Thus, it is recognized that as the intensities of the red, green and blue electron beams emitted by the red, green and blue cathodes 14R, 14G and 14B, respectively, are modulated by the color signals produced by matrix circuit 114 so as to correspondingly reproduce a color video picture on the screen of color cathode ray tube 30, transitions of the video signal $S_O$ between relatively low and high brightness levels are used to produce compensation signals at the output of differentiating circuit 118. These compensation signals, after amplification, modulate the velocity at which the electron beams scan the display screen of tube 30 in the line-scanning, or horizontal, direction. That is, while the modulated electron beams are scanned across the screen of tube 30 in line-scanning and vertical directions, respectively, the scanning velocity of each beam in the line-scanning direction is modulated in accordance with transitions of video signal $S_O$ corresponding to transitions in the displayed image between high and low brightness levels. These transitions in the video signal, and thus in the brightness level of the displayed video picture, result in positive differentiated pulses at dark-to-light transitions, and in negative differentiated pulses at light-to-dark transitions, as shown in FIGS. 1A and 1B. The resultant beam-scanning velocity modulations of the electron beams improve the sharpness of the displayed image in the line-scanning direction.

Although cathode ray tube 30 shown in FIG. 3 has been described as a color cathode ray tube, it is appreciated that the aforedescribed beam-scanning velocity modulation technique can be utilized with a monochrome, or black-and-white cathode ray tube. When a monochrome CRT is used, the chrominance channel shown in FIG. 3 is omitted, and the output of amplifier 113, representing the varying brightness level of the video signal, is used to modulate the intensity of the electron beam which is emitted by the electron gun in the CRT. The beam-scanning velocity modulation control channel will remain as shown and described above.

The present invention, when used in conjunction with the apparatus shown in FIG. 3, is effective to modify the shape of the electron beam or beams which impinge upon the display screen of the CRT. Typically, the shape of the landing beam spot derived from each electron beam is substantially circular, as represented by the broken line shown in FIG. 4. The present invention reshapes this circular beam landing spot so as to be substantially oval shaped, as shown by the solid line in FIG. 4, with the longer axis of this oval shape disposed in the horizontal, or line-scanning direction, and the shorter axis disposed in the vertical direction.

In a typical cathode ray tube of the prior art, each electron beam is focused such that when the beam is incident on the center of the display screen, the shape of the landing beam spot formed thereby is circular. This desired circular shape may, in some instances, be distorted at various scanning locations of the beam, for example, at the respective corners of the display screen.

Figure 5:
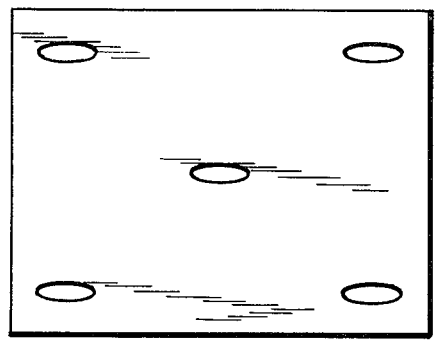
FIG. 5 represents the shape of a landing beam spot at various locations on the display screen of video signal reproducing apparatus.

However, the prior art has attempted to compensate for such distortions in the shape of the landing beam spot. In contradistinction thereto, the present invention deliberately reshapes each electron beam so as to be substantially oval-shaped at all beam landing locations. Thus, the oval shape of the beam landing spot along the periphery of the display screen is even more pronounced, as shown in FIG. 5. As shown, the landing beam spot exhibits this oval shape when the central portion of the display screen is scanned as well as when the respective corners of the screen are scanned.

Figure 6:
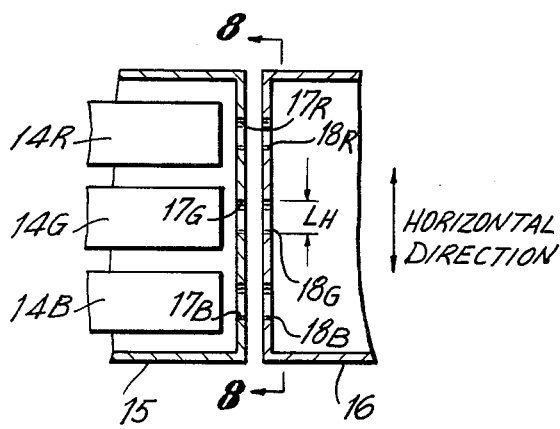
FIG. 6 is an axial sectional view taken in the horizontal plane of an electron gun in a cathode ray tube which incorporates the present invention.
Figure 7:
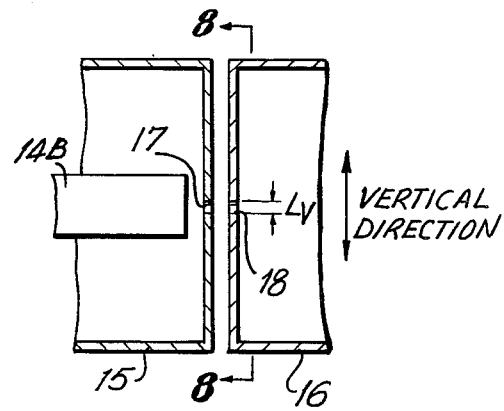
FIG. 7 is an axial sectional view in the vertical plane of the electron gun shown in FIG. 6.
Figure 8:
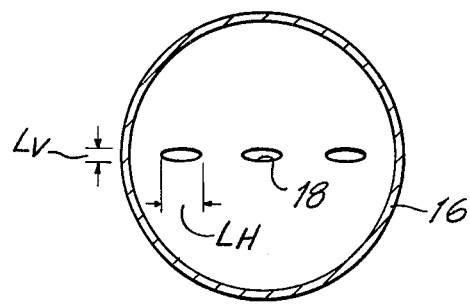
FIG. 8 is a sectional view taken along the lines 8—8 in FIGS. 6 and 7.

One preferred embodiment for establishing the oval shape for the respective electron beams which are incident on the display screen is shown with respect to FIGS. 6-8 which illustrate a portion of the electron gun used in, for example, the Trinitron-type color cathode ray tube. Red, green and blue cathodes 14R, 14G and 14B, respectively, have their electron beam-generating surfaces disposed in a plane which is substantially perpendicular to the axis of the gun and, therefore, to the axis of the cathode ray tube. All of the cathodes are aligned in a horizontal plane with their respective electron beams which are emitted therefrom being directed in a substantially horizontal plane which contains the axis of the electron gun. A first grid 15 is spaced from the beam-generating surfaces of cathodes 14R, 14G and 14B and has apertures $17_R$, $17_G$ and $17_B$, respectively, formed in alignment with the respective beam-generating surfaces of these cathodes. A second grid 16 is spaced from first grid 15 and has apertures $18_R$, $18_G$ and $18_B$ formed in alignment with respective apertures $17_R$, $17_G$ and $17_B$, respectively, of first grid 15. Although not shown herein, additional grids or electrodes are arranged successively in the axial direction, these additional grids being operative to provide the so-called unipotential main focusing lens by which all of the electron beams are focused at the display screen.

The set of apertures $17_R$, $17_G$ and $17_B$, or the set of apertures $18_R$, $18_G$, $18_B$, or both sets of apertures are of oval shapes. The cross-sectional view shown in FIG. 8 illustrates the oval shapes for apertures 18, each aperture having its longer axis of length $L_H$ disposed in the horizontal, or line-scanning direction, and its shorter axis of length $L_V$ disposed in the orthogonal vertical direction. Thus, these apertures shape the electron beams emitted from cathodes 14R, 14G and 14B, respectively, such that each beam landing spot is substantially oval-shaped.

As discussed above, the oval shape of the landing beam spots improves the sharpness of the displayed video picture in the vertical direction because the vertical dimension of the beam spot is reduced, yet the overall area of the beam spot is substantially the same, and thus does not diminish the intensity of the beam which is incident on the display screen. Consequently, with the oval shape shown herein, the landing beam spot is effective to excite the phosphor elements or areas to the same level as heretofore, thus avoiding a reduction in the brightness of the displayed image. That is, in accordance with this invention, improved sharpness in the vertical direction is not attained at the expense of a reduction in image brightness. Accordingly, the present invention exploits the advantages achieved by beam-scanning velocity modulation in combination with the advantages of modifying the shape of the beam landing spot so as to improve the overall sharpness of the displayed video picture.

While the present invention has been particularly shown and described with reference to a preferred embodiment thereof, various changes and modifications in form and details will become readily apparent to one of ordinary skill in the art. For example, the apertures shown in the first and second grids of the electron gun may be formed as rectangular slits whose longer axis is aligned in the line-scanning direction, provided such slits result in the oval shape for the beam landing spot. As another example, the shape of the electron beams can be modified in accordance with a suitable distribution of the magnetic field strength in the horizontal and vertical deflection fields. By using such magnetic fields to shape the electron beams as desired, the apertures shown in the first and second grids need not exhibit the above-described shapes. As yet another example, beam-scanning velocity modulation may be achieved by providing the compensation signal to the main deflection assembly. It is intended that the appended claims be interpreted as including these as well as various other such changes and modifications.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of improving the sharpness of an image displayed on the screen of a cathode ray tube in video signal reproducing apparatus, comprising the steps of modulating the intensity of at least one electron beam in accordance with a video signal; scanning each said modulated electron beam in line-scanning and vertical directions, respectively, across said screen; modulating the scanning velocity of each said electron beam in said line-scanning direction in accordance with transitions of said video signal between relatively high and low levels of brightness of the displayed image; and improving the sharpness of said displayed image in the vertical direction by shaping each said electron beam to have an oval shape at its landing on said screen with the longer axis of said oval shape disposed in said line-scanning direction and the shorter axis of said oval shape disposed in said vertical direction.

2. The method of claim 1 wherein said step of improving said sharpness by shaping each said electron beam comprises directing each said electron beam through respective oval-shaped apertures in grids of the electron gun of said cathode ray tube before said electron beam is scanned across said screen.

3. The method of claim 2 wherein said step of modulating the scanning velocity of each said electron beam comprises differentiating said video signal to produce positive and negative pulses at the positive and negative transitions, respectively, of said video signal as the brightness of said displayed image abruptly changes from a low level to a high level and from a high level to a low level, respectively; and modulating said scanning velocity of each said electron beam in said line-scanning direction with said pulses.

4. Video signal reproducing apparatus for receiving a video signal and for displaying a video picture reproduced from said received video signal, said apparatus comprising:

a cathode ray tube including electron gun means for generating at least one electron beam and for directing the same to a landing on a display screen whereat said video picture is displayed;

video signal receiving means for receiving said video signal and for modulating the intensity of said at least one electron beam in accordance with said video signal to control the brightness of said displayed video picture;

deflection means for deflecting said at least one electron beam in line-scanning and vertical directions to cause said at least one electron beam to scan said screen;

means for modulating the scanning velocity of said at least one electron beam in said line scanning direction in accordance with transitions of said video signal between relatively high and low levels of brightness of said displayed video picture; and shaping means for improving the sharpness of said displayed video picture in the vertical direction including means for providing said at least one electron beam, at said landing thereof on the display screen, with a substantially oval cross-sectional shape having the longer axis thereof disposed in said line-scanning direction and the shorter axis thereof disposed in said vertical direction.

5. The apparatus of claim 4 wherein said electron gun means includes at least one grid through which said at least one electron beam passes; and said means for providing the substantially oval cross-sectional shape comprises at least one oval-shaped aperture in said at least one grid.

6. The apparatus of claim 5 wherein said electron gun means includes at least one cathode to emit said at least one electron beam; a first grid adjacent said at least one cathode having at least one oval-shaped aperture therein; and a second grid adjacent said first grid having at least one oval-shaped aperture therein, said cathode and said oval-shaped apertures in said first and second grids being in alignment with each other.

7. The apparatus of claim 5 wherein said electron gun means includes plural cathodes aligned to emit plural electron beams disposed in a common plane; a first grid adjacent said cathodes and having plural oval-shaped apertures therein; and a second grid adjacent said first grid and having plural oval-shaped apertures therein, respective ones of said cathodes and said oval-shaped apertures being in alignment such that respective ones of said electron beams pass through said oval-shaped apertures.

8. The apparatus of claim 4 wherein said video signal is a composite color video signal including luminance and chrominance components; and said scanning velocity of said at least one electron beam is modulated in accordance with said transitions in at least said luminance component.

9. The apparatus of claim 8 wherein said means for modulating the scanning velocity of said at least one electron beam comprises means for generating control signals at the positive and negative transitions of at least said luminance component as the brightness of said displayed video picture changes abruptly; and means for using said control signals to modulate said scanning velocity.

10. The apparatus of claim 4 wherein said means for modulating the scanning velocity of said at least one electron beam comprises differentiating means for differentiating said video signal to produce positive and negative pulses at the positive and negative transitions, respectively, of said video signal as the brightness of said video picture changes abruptly between lower and higher levels of brightness; auxiliary deflection means for providing an auxiliary deflection of said at least one electron beam; and means for applying said positive and negative pulses to said auxiliary deflection means as auxiliary deflection signals therefor.

* * * * *